(12) United States Patent
Seto

(10) Patent No.: US 6,200,665 B1
(45) Date of Patent: Mar. 13, 2001

(54) STEPPED GLASS SHEET

(75) Inventor: Shigeyuki Seto, Aiko-gun (JP)

(73) Assignee: Asahi Glass Company Ltd., Tokyo (JP)

( * ) Notice: Subject to any disclaimer, the term of this patent is extended or adjusted under 35 U.S.C. 154(b) by 0 days.

(21) Appl. No.: 09/326,630

(22) Filed: Jun. 7, 1999

(30) Foreign Application Priority Data

Jun. 8, 1998 (JP) .................................................. 10-175403

(51) Int. Cl.[7] .............................. B32B 23/02; B32B 7/02; B60J 1/12
(52) U.S. Cl. ...................... 428/192; 428/156; 428/213; 428/218; 428/219; 428/220; 428/410; 296/146.16
(58) Field of Search ....................... 65/114, 115; 428/410, 428/220, 212, 213, 192, 426, 156, 218, 219, 174; 296/89, 84.1, 146.16, 146.2

(56) References Cited

U.S. PATENT DOCUMENTS

| 5,380,575 | 1/1995 | Kuster et al. ........................... 428/98 |
| 5,397,647 | 3/1995 | Kramling et al. ..................... 428/426 |
| 5,570,542 | * 11/1996 | Cameron ................................ 49/463 |

FOREIGN PATENT DOCUMENTS 0 884 286   12/1998  (EP) .
62-32892    8/1987   (JP) .

* cited by examiner

*Primary Examiner*—Donald Loney
(74) *Attorney, Agent, or Firm*—Oblon, Spivak, McClelland, Maier & Neustadt, P.C.

(57) ABSTRACT

A tempered stepped glass sheet wherein the averaged value of surface compressive stresses in an intermediate region B is 100–500 kg/cm² larger than the averaged value of surface compressive stresses in a central region C.

19 Claims, 3 Drawing Sheets

STEPPED GLASS SHEET

The present invention relates to a glass sheet having a stepped portion (hereinbelow, referred to as a stepped glass sheet). In particular, the present invention relates to a tempered stepped glass sheet used for a side window glass for an automobile.

There has been known as a tepering method, a method for quenching by blowing a jet stream-like cooling medium to both surfaces of a glass sheet heated to a temperature near a glass softening point by means of an air blowing device in which cooing nozzles are arranged in a lattice or zigzag form. In such tempering method, a temperature difference is given between an inner portion and a surface of the glass sheet at the time of quenching whereby a layer having a residue compressive stress is formed in the surface of the glass sheet solidified.

When the glass sheet has infinite dimensions in longitudinal and lateral directions and a predetermined thickness, and if both surfaces of the glass sheet are uniformly quenched, a stress distribution in the direction of the thickness follows a so-called parabolic distribution. Then, a surface compressive stress value is equal to two times as much as a tensile stress value at the center of an inner portion in the direction of the thickness of the glass sheet, and the integrated value of stresses in the direction of the thickness becomes zero. In fact, however, a glass sheet has infinite dimensions. Generally, a chamfering treatment is conducted to the peripheral edge portion from the viewpoints of preventing cracking in a quenching time as well as design.

In quenching the glass sheet having an edge surface, quenching to the peripheral edge portion of the glass sheet affects the entire portion of the edge surface at (unlike a central region where there is scarcely influence of the peripheral edge portion), and it affects locally the entire thickness of the peripheral edge portion. Specifically, there are produced, in an extreme peripheral edge portion of the glass sheet, a region having a width twice to three times as much as the thickness of the glass sheet in which the averaged integrated value of stresses in the direction of the thickness exhibits compressibility, in an inner portion of the glass sheet, and an intermediate region in which the averaged integrated value of stresses in the direction of the thickness exhibits tension so as to balance the compressibility. This means that there is a region which is weak against an impact from the outside and which has a width in a portion slightly inside the peripheral edge portion of the glass sheet.

Here, description is made as to the averaged integrated value as well as the direction of a principal stress and a principal stress difference. First, a plane which is perpendicular to a glass sheet surface (a cross-sectional plane of the glass sheet) is selected. In the selected plane, any angle can be taken with respect to a linear line which is parallel to the glass sheet surface. Further, a point is selected in the selected plane. The values of stresses acting on this point, which are perpendicular to the selected plane, are different depending on angles in the selected plane, and accordingly, there are an angle at which a stress value is the maximum and an angle at which a stress value is minimum. The principal stress directions are a direction of a stress exhibiting the maximum value and a direction showing the minimum value which intersects at a right angle the direction of the stress exhibiting the maximum value. Hereinbelow, the direction of the stress exhibiting the maximum value is referred to as the principal stress direction.

Since the principal stress itself can not directly be measured, the principal stress in a tempered glass is evaluated by the principal stress difference obtained by a photoelasticity method. The principal stress difference obtained by the photoelasticity method corresponds to a value obtained by dividing the sum of values of the difference between the maximum value of stress and the minimum value of stress at each point aligned in the direction of the thickness of the glass sheet by the thickness of the glass sheet (an averaged value obtained by dividing an integrated value of the difference between the maximum value of stress and the minimum value of stress by the thickness). Accordingly, when a certain point is selected on a surface of the glass sheet, an averaged integrated value of the difference between the maximum value of stress and the minimum value of stress at each point which is aligned in the direction of the thickness from the selected point, is referred to as the principal stress difference at the selected point (the principal stress direction in this case is referred to as the principal stress direction at this point). In this specification, any principal stress direction exists in parallel to the glass sheet surface.

As a window glass disposed in a side window, especially a slidable door window, of an automobile, a stepped glass sheet as a kind of a window glass sheet, which eliminates any step between the glass sheet and a flange of automobile body, has been developed in response to needs for improving an aerodynamic performance and designing of automobiles. FIG. 3 is a diagram showing an example of the shape of a peripheral edge portion of a glass sheet and a state of arrangement. In FIG. 3, reference numeral 1 designates a glass sheet having a stepped portion at its peripheral edge portion. Numeral 2 designates a sash having a recess 3 in which the peripheral edge portion of the glass sheet 1 is fitted. In this glass sheet, a chamfering operation is conducted to the peripheral edge portion to form a stepped portion whereby a thinner thickness portion is formed with a predetermined width, adjacent to a thicker thickness portion.

In particular, the stepped glass sheet to be disposed at a side of an automobile is adapted to frequently be slid in a vertical direction or an oblique vertical direction. Accordingly, the peripheral edge portion of the glass sheet suffers highly severe mechanical load, and a sufficient strength to endure such load is required to the glass sheet In the conventional method, however, the stepped glass sheet was tempered by equalizing a cooling rate over the entire surface of the glass sheet. Accordingly, it was difficult to apply a sufficient strength because stress values in a compressive stress layer in a surface portion of the intermediate region were relatively small It is an object of the present invention to provide a stepped glass sheet having a peripheral edge portion which is durable to a highly severe mechanical load In accordance with the present invention, there is provided a stepped glass sheet having a peripheral edge region A, a central region C and an intermediate region B provided between the peripheral edge region A and the central region C wherein a stepped portion is formed at the border between the peripheral edge region A and the intermediate region B, and the thickness of the peripheral edge region A is thinner than the thickness of the central region C, characterized in that the stepped glass sheet is tempered, and the averaged value of surface compressive stresses in the intermediate region B is 100–500 kg/cm$^2$ larger than the averaged value of surface compressive stresses in the central region C.

Preferred embodiments of the present invention will be described with reference to the drawings.

Figure 1:
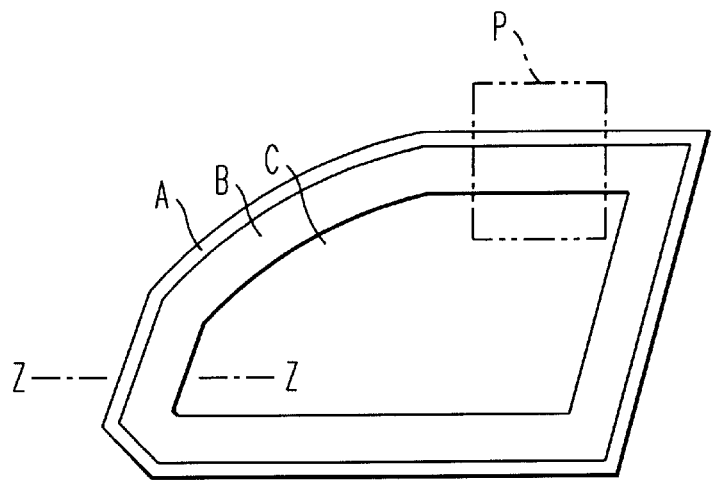
FIG. 1 is a schematical front view of an embodiment of a stepped glass sheet according to the present invention.
Figure 2:
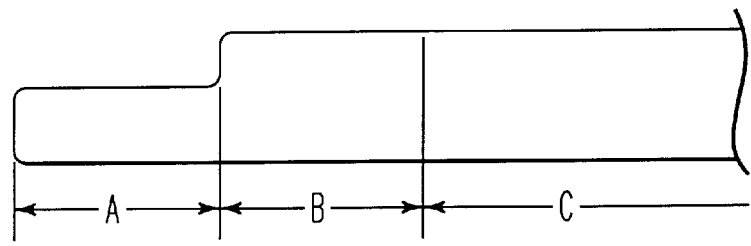
FIG. 2 is a schematical cross-sectional view of an embodiment of a stepped glass sheet according to the present invention.
Figure 3:
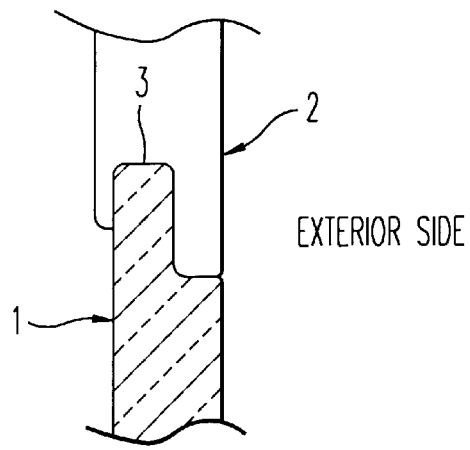
FIG. 3 is a diagram showing an example of a state of arrangement of the stepped glass sheet.

FIG. 1 is a front view of an embodiment of a stepped glass sheet of the present invention, and FIG. 2 is an enlarged cross-sectional view taken along a line Z—Z in FIG. 1. In FIGS. 1 and 2, a symbol A designates a peripheral edge region, a symbol C designates a central region which has a thicker thickness than the peripheral edge region A, and a symbol B designates an intermediate region located between the central region C and the peripheral edge region A. The intermediate region B has the same thickness as the central region C. As shown in FIG. 1, each of the regions A, B and C are regions defined when the glass sheet is viewed in a flat state.

In the present invention, the above-mentioned stepped glass sheet is such glass sheet which undergoes a tempering treatment. Further, the averaged value of surface compressive stresses in the intermediate region B is larger by 100–500 kg/cm$^2$ in comparison with the averaged value of surface compressive stresses in the central region C. Thus, a sufficient strength is provided in a boundary region (i.e., the intermediate region B) adjacent to a thinner thickness portion which is adjacent to the thicker thickness portion as the intermediate region in which the averaged integrated value of stresses in the direction of the thickness exhibits tension.

When the averaged value of surface compressive stresses in the intermediate region B has a strength corresponding to a value of less than 100 kg/cm$^2$ in comparison with the averaged value of surface compressive stresses in the central region C, the glass sheet is short in strength to endure a frequent vertical sliding movement of the glass sheet when it is fitted to a side window of automobile. Therefore, the averaged value of surface compressive stresses in the intermediate region B should be at least 100 kg/cm$^2$ larger than the averaged value of surface compressive stresses in the central region C.

In the present invention, the intermediate region B preferably has a width of 5–30 mm which extends from the border between the peripheral edge region A and the intermediate region B toward a radially inner portion along the surface of the glass sheet With this, the intermediate region B in which the averaged integrated value of stresses in the direction of the thickness exhibits tension bridges both the peripheral edge region A (having a thinner thickness portion) and the central region C (having a thicker thickness portion), and therefore, a sufficient strength can be maintained.

In the present invention, it is further preferable that the tempered stepped glass sheet has featured points in a portion having a high averaged value of surface compressive stresses, each of the featured points having a larger principal stress difference than any point near and around the featured points Further, the distance between any of the above-mentioned featured points and a second featured point which is nearest to the above-mentioned featured point and which has a larger principal stress difference than any point near and around the second featured point is 5–15 mm preferably. By providing such principal stress difference, the occurrence of large fragments can be controlled even when the glass sheet is broken.

Figure 4:
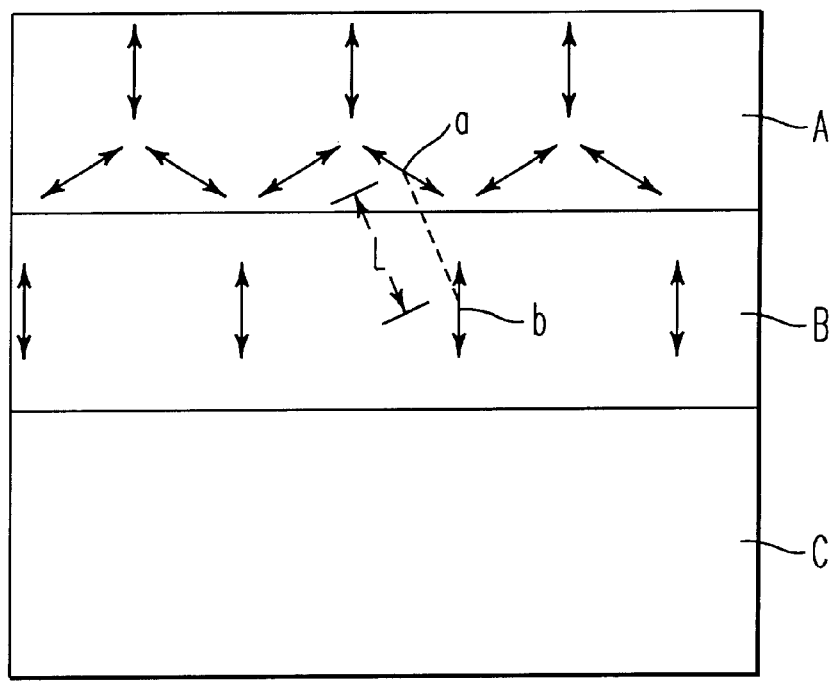
FIG. 4 is an enlarge view of a portion P in FIG. 1.

Further detailed explanation will be made with reference to FIG. 4 which is a diagram showing in an enlarged scale a portion P in FIG. 1. In the intermediate region B, there are scattered featured points b having larger principal stress difference than any point near and around featured points b. In this embodiment, the principal stress direction at a featured point b is perpendicular to the direction of the edge line of the glass sheet. On the other hand, in the peripheral edge region A, there are scattered featured points a having larger principal stress difference than any point near and around the featured points a. In this embodiment, with respect to adjacent featured points a, the principal stress directions of the featured points a direct different directions. In this embodiment, the point nearest to the featured point b is the featured point a as shown in FIG. 4. The value L indicated by a dotted line is in a range of 5–10 mm. With this structure, the occurrence of the larger fragments at the time of breaking the glass sheet can be prevented.

In this embodiment, the nearest point to the featured point b is the featured point a in the peripheral edge region A. On the other hand, when the nearest point to the featured point b is not the featured point a, but another featured point b in the intermediate region B, L exists between the featured points b in the intermediate region. When there is another featured point having larger principal stress difference than any point near and around the featured point b in the central region C, and the featured point is at the closest distance to the featured point b, the distance corresponds to L.

Figure 5:
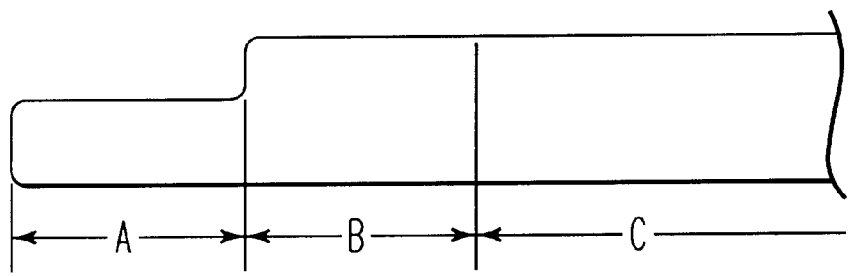
FIG. 5 is a schematical cross-sectional view showing another embodiment of a stepped glass sheet according to the present invention.

In this embodiment, a stair-like stepped portion is formed at the border between the peripheral edge region A and the intermediate region B. Besides, a stepped portion can be formed at the border even in a case that the border between the peripheral edge region A and the intermediate region B is formed to have a smooth stepped portion. In an embodiment that a stepped portion is formed from the intermediate region B toward the peripheral edge region A, when an upper surface of the glass sheet is traced from left to right, a traced locus changes from a downwardly projecting curve to an upwardly projecting curve (FIG. 5). Namely, there is an inflection point between the peripheral edge region A and the intermediate region B. The inflection point can be referred to as the border which forms a substantially stepped portion between the peripheral edge region A and the intermediate region B. In the present invention, it is preferable that the width of the peripheral edge region A is in a range of 5–15 mm from the extreme edge of the glass sheet from the viewpoint of fitness to the automobile body even when the shape of the stepped is portion is in a stair-like form (FIG. 2) or a smooth form (FIG. 5).

As the means for tempering the glass sheet in order to satisfy the above-mentioned conditions, a method for quenching the glass sheet by blowing a jet-stream-like cooling medium to both surfaces of the glass sheet heated to a temperature near the softening point of glass can be conducted. Preferably, a quenching apparatus as described in EP884286A is used.

The quenching apparatus comprises quenching boxes disposed so as to oppose to each surface of a glass sheet and a plurality of nozzles attached to the quenching boxes at positions facing the both surfaces of the glass sheet wherein cooling air is blown through each nozzle to the glass sheet heated to a predetermined temperature. Each of the nozzles is in a tubular form having a projected curved free end surface so as to face the glass sheet, and the free end surface is provided with a plurality of outlets for blowing cooling air supplied from the quenching boxes to the glass sheet.

Use of the quenching apparatus having the nozzles in which a plurality of outlets are formed in the free end surface is advantageous in the following points. Namely, a danger of conflict of the nozzle to the glass sheet which may cause when the glass sheet is oscillated in the condition of being closer to the glass plate for quenching, in order to increase quenching performance, can be prevented. Specifically, the pitch between adjacent nozzles can be made small. By such arrangement, a distance of oscillating of the glass sheet can be reduced whereby the conflict between the nozzles and the glass sheet is avoidable. Further, there is provided a distinctive difference of quenching performance at the border around a portion having a large quenching performance and a portion having a small quenching performance. Further, when the diameter of the outlets is made small, the sensitivity of quenching performance to the distance between the glass sheet and the nozzles can be increased. A large difference of quenching performance can be produced between a thinner thickness portion and a thicker thickness portion in a case that the distance between the glass sheet and the nozzles is changed for each of the regions in the glass sheet and even if the difference of distances is small. Thus, a desirable distribution of stress can be obtained in the present invention.

Namely, in use of the above-mentioned quenching apparatus having a plurality of nozzles in which a plurality of outlets for blowing cooling air to the glass sheet, the distance between the glass sheet and the nozzles is determined to be shorter in the intermediate region B for which a high averaged value of surface compressive stresses is required. Therefore, the averaged value in the region B is made larger by 100–500 $kg/cm^2$ in comparison with the averaged value of surface compressive stresses in the central region C. On the other hand, the distance between the glass sheet and the nozzles is determined to be longer to a region in which a high averaged value of surface compressive stresses is not required. Thus, the cooling performance is selectively changed for several regions.

In the stepped glass sheet, the thickness of the peripheral edge region A is thinner than the thickness of the central region C. Accordingly, when the averaged value of surface compressive stresses in the intermediate region B is increased by 100–500 $kg/cm^2$ in comparison with the averaged value of surface compressive stresses in the central region C, the averaged value of surface compressive stresses in the peripheral edge region A can be increased by 100–300 $kg/cm^2$ in comparison with the averaged value of surface compressive stresses in the central region C. In order to obtain a desirable strength in a state of usual use, the averaged value of surface compressive stresses in the central region C is preferably in a range of 850–1200 $kg/cm^2$.

Besides the above-mentioned quenching apparatus, a conventional quenching apparatus may be used to suppress undesirable influence to an unnecessary portion if the border between a portion requiring a larger cooling performance and a portion requiring a smaller cooling performance can clearly be provided. Further, a conventional quenching apparatus having nozzles which are replaced by the nozzles having a plurality of outlets as used in the above-mentioned embodiment may be used. Thus, a glass sheet having a predetermined strength in the intermediate region B as well as the peripheral edge region A which is thinner in the thickness in comparison with that the intermediate region B or the central region C.

The stepped glass sheet having preferable stress values is suitably used as a vertically slidable glass sheet for a side window of automobile. For the purposes of reducing an aerodynamic resistance for an automobile and improving design, there is proposed that a sash of automobile and a side window of automobile should be flush. On the other hand, the gap between the side window and the sash is apt to be a target of inserting a tool for robbery. In attempting to obtain a flush surface between the sash and the side window, an amount of the engagement of the side window with the sash is apt to be small. Accordingly, it is difficult to prevent the insertion of the tool for robbery when a side window having a conventional structure is used.

When the stepped glass sheet is used for the side window, it is possible to obtain an assembled structure of side window which prevents the insertion of the tool for robbery. Therefore, the stepped glass sheet is preferably used as a vertically slidable glass sheet for the side window of automobile. Further, when each of stress values in the stepped glass sheet is designed to have a preferable stress value as described above, the stepped glass sheet having a sufficient strength and a predetermined fragmentation required for a side window of automobile can be obtained.

Glass sheets for a side window of automobile are generally bent-shaped. Further, for the purpose of forming a flush surface between the side window and the sash, the formation of a stepped portion in the surface facing the exterior of the automobile is preferable from the viewpoint of assembling the glass sheet to the automobile. Accordingly, the stepped portion is preferably formed in a convex surface of the glass sheet, which faces the exterior of the automobile. In this case, stepped portion should be formed in only the convex surface of the glass sheet facing the exterior of the automobile from the standpoint of the strength.

A vertically slidable side window is connected to a sliding regulator installed inside a door of the automobile. In this case, the glass sheet for the side window is connected to the sliding regulator at its lower side of glass sheet in a state of being attached. The portion of the glass sheet which is connected to the sliding regulator suffers a severe mechanical load because a driving force for sliding is transmitted thereto. Accordingly, it is preferable that the stepped glass sheet of the present invention has a stepped portion at a portion excluding the lower side in the entire periphery of the glass sheet.

Both sides of the glass sheet are engaged with both sides of the sash so that the vertical sliding movement of the side window is guided. From the viewpoints of improving accuracy in the guiding operation and the application of a mechanical load in the guiding, the stepped portion is preferably formed in a portion excluding a lower side portion and both side portions in the entire periphery of the glass sheet, i.e., only an upper side. On the other hand, the width of an engaging groove of the sash in which the side window is fitted should have the same width as the upper side portion and the both side portions of the sash because of easiness of forming the sash. Prom the viewpoints of easiness of forming the sash and the formation of a flush surface between the sash and the side window in both side portions of the automobile, it is preferable to form the stepped portion at the upper side and at least both side portions in the entire periphery of the stepped glass sheet of the present invention.

The locations corresponding to the upper side, the both sides and the lower side of the stepped glass sheet in a state that it is attached to an automobile in this specification can be explained using FIG. 1. The lower side in the attached state to the automobile corresponds to the lower side of the glass sheet in FIG. 1. The both sides in the attached state correspond to left and right sides of the glass sheet in FIG. 1. The upper side in the attached state to the automobile corresponds to the upper side including a slanted side in a left upper portion of the glass sheet in FIG. 1. The stepped glass sheet shown in FIG. 1 shows an example that the stepped portion is formed in the entire periphery of the glass sheet.

An example that the stepped portion is formed in the periphery of the glass sheet excluding a lower side corresponds to an example such that the cross-sectional shape of the upper side and left and right sides of the glass sheet in FIG. 1 has a shape as shown in FIG. 2, and the thickness of a lower side portion of the glass sheet is uniform. An example of the glass sheet having a stepped portion only in an upper side portion corresponds to an example such that the cross-sectional shape of an upper side of the glass sheet in FIG. 1 has a shape as shown in FIG. 2, and the thickness in cross section of the glass sheet in both side portions and a lower side portion is uniform.

Figure 7:
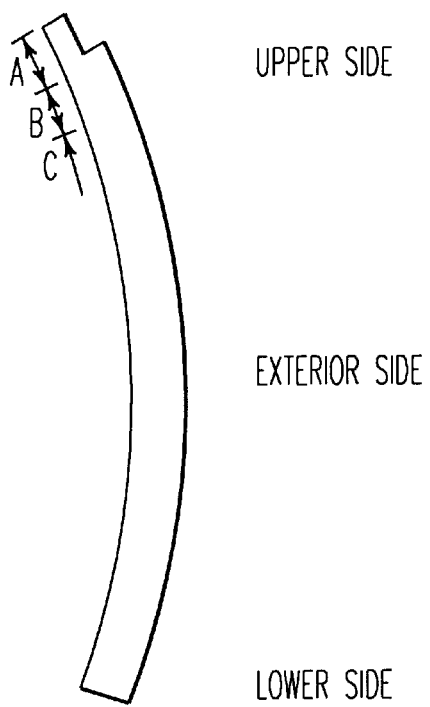
FIG. 7 is a schematical cross-sectional view of an embodiment of a stepped glass sheet according to the present invention.

FIG. 7 shows an example of a stepped glass sheet having a convex surface facing the exterior of an automobile wherein a stepped portion is formed in an upper side portion and no stepped portion is formed in a lower side portion. FIG. 7 is a cross-sectional view sectioned in a vertical direction of the glass sheet in a state that it is attached to an automobile. FIG. 7 does not show the detail of side portions of the glass sheet. However, when a stepped portion is formed in each side portion, the cross-sectional shape of each side corresponds substantially to the cross-sectional shape of the upper side portion in FIG. 7. When no stepped portion is formed in each side, the cross-sectional shape of each side corresponds substantially to the cross-sectional shape of the lower side in FIG. 7.

The stepped glass sheet of the present invention is a single solid glass sheet in which there are portions having different thicknesses. Namely, the stepped glass sheet of the present invention is a single solid glass sheet wherein the thickness of the peripheral edge region A is smaller than the thickness of the central region C. Accordingly, it is unnecessary to consider accuracy of bonding two glass sheets as in a laminated glass which is formed by laminating two glass sheets by interposing an interlayer.

The tempering treatment for the glass sheet includes heating and quenching steps. When a bent-shaping is conducted to the glass sheet which had subjected to heating and quenching steps, there takes place a slight error in accuracy of bent-shaping. Such slight error is permissible in a state that the glass sheet is attached to an automobile. However, when two glass sheets are laminated by interposing an interlayer, such error will cause defective bonding in a peripheral portion of the laminated glass. Since an upper side of a side window glass for an automobile is exposed to outer air when it is descended, the bend-shaping of the glass sheet should accurately be conducted so as not to cause the defective bonding. On the other hand, since the stepped glass sheet of the present invention comprises a single solid glass sheet, it is unnecessary to consider accuracy of bonding as required for the laminated glass.

In the following, description will be made as to a method of measuring the stress values.

(A) Measurement of an Averaged Surface Compressive Stress

JIS R3222 is applicable to the measurement of surface compressive stresses. JIS R3222 concerns heat strengthened glass. In the measurement, the tempered stepped glass sheet of the present invention is measured as samples since it is a heat strengthened glass. The above-mentioned Japanese standards describes points to be measured. However, in the measurement of compressive stresses in the tempered stepped glass sheet of the present invention, a plurality of optionally selected points are measured irrespective of the standard. Then, an average value of surface compressive stress is obtained from the measured values at the plurality of points. For the measurement of the points, it is preferable to select, in each region, the same number of points in which the surface compressive stress value is expected to have the maximum value and the surface compressive stress value is expected to have the minimum value. Further, it is appropriate to consider that the surface compressive stress value be the maximum at a point where the blowing direction of a cooling air stream for cooling the glass sheet intersects the surface of the glass sheet. Further, it is appropriate to consider that the surface compressive stress value be the minimum at the middle point between adjacent two points of intersection.

Figure 6:
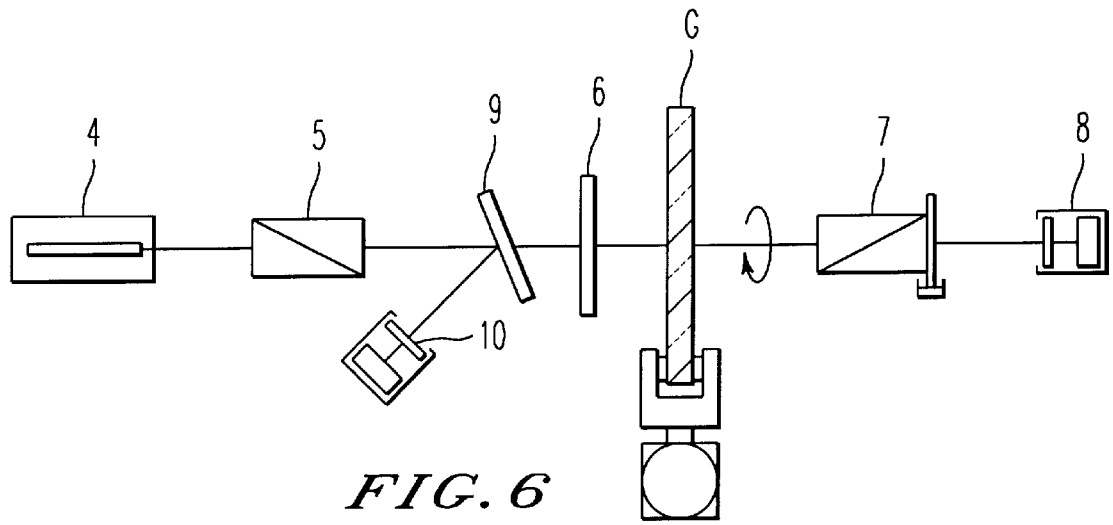
FIG. 6 is a diagram explaining a method for measuring a principal stress direction and a principal stress difference.

(B) The Measurement of a Principal Stress Direction and a Principal Stress Difference FIG. 6 shows a measuring device for measuring a principal stress direction and a principal stress difference. In the basic structure, a principal stress direction and a principal stress difference can be obtained by introducing a circular polarized light into the tempered stepped glass sheet G and measuring a polarized state of an elliptically polarized light which is formed by a strain of the tempered stepped glass sheet G and passed therethrough. Light emitted from a light source 4 is passed through a polarizer 5 to form a linearly polarized light. Then, the linearly polarized light is passed through a ¼λ retardation plate 6 to form a circularly polarized light. An analyzer 7 is disposed behind the tempered stepped glass sheet G. The tempered stepped glass sheet G is placed perpendicularly to the incident light. The circularly polarized light incident into the tempered stepped glass sheet G transmits through the tempered stepped glass sheet G to be an elliptically polarized light which is depending on a stress-strain of the tempered stepped glass sheet G. The thus obtained elliptically polarized light is introduced into the analyzer which is rotated. The light passing through the rotating analyzer 7 is introduced into a light detection element 8. By measuring an output of the light detecting element 8, a state of the elliptically polarized light can be detected.

A principal stress direction and a principal stress difference can be obtained as follows from a state of the obtained elliptically polarized light. when $\theta_1$ and $\theta_2$ represent principal stress directions and δ represents a phase difference corresponding to a principal stress difference, an output I (Φ) of the light detection element is expressed by the following Formula (1):

$$I(\Phi)=k\{1-\sin\delta\cdot\sin 2(\theta-\Phi)\} \quad (1)$$

where k is a proportionality factor and Φ is an angle of rotation of the analyzer.

The ratio of the minimum value $I_{min}$ to the maximum value $I_{max}$ of an output on the analyzer represents an ellipticity R. R and δ are linked in the following Formula (2):

$$R = I_{min}/I_{max} = (1-\sin \delta)/(1+\sin \delta) \quad (2)$$

(where $\delta > 0$).

Accordingly, the phase difference $\delta$ and principal stress directions $\theta_1$, $\theta_2$ are expressed by the following Formulas (2)', (3) and (4):

$$\delta = \sin^{-n}\{(1-R)/(1+R)\} \quad (2)'$$

$$\theta_1 = \Phi + \pi/4 \pm n\pi \quad (3)$$

$$\theta_2 = \Phi - \pi/4 n\pi \quad (4)$$

A principal stress difference $\Delta\sigma$ is expressed by the following Formula (5).

$$\Delta\sigma = \lambda/(c \cdot t) \times \frac{\delta}{360} \quad (5)$$

where $\lambda$ is the wavelength of the light emitted from a light source 41 (in this measuring device, $\lambda = 632.8$ nm), c is the photoelasticity constant (c=2.63 nm/cm/kg/cm², and t is a thickness of the tempered stepped glass C at the measuring point).

Namely, the principal stress difference and the principal stress direction can be obtained by obtaining an ellipticity R of the elliptically polarized light and an angle of rotation $\Phi$ of the analyzer (an angle of a long axis of an ellipse when the maximum and minimum output values are obtainable).

In the stress measuring device, a He—Ne laser is used for the light source 4 because laser beams can be throttled to a small point so that a slight change of the tempered glass such as uneven tempering can be detected. A Gram-Tompson prism having excellent polarizing characteristics was used for the polarizer 5. A glass sheet 9 was disposed between the polarizer 5 and the ¼ $\lambda$ retardation plate 6 to take the reference light. An interference filter 10 was disposed between the glass sheet 9 and a reference light detector so as to minimize the influence of outer light. The ¼$\lambda$ retardation plate 6 used has such one that was formed by polishing quartz to produce a phase difference of $\pi/2$ to a wavelength of 632.8 nm. The rotating analyzer 7 used was the same as the analyzer 5. For the light detecting element 8, a solar cell with an interfering filter at its front side was used so as to minimize the influence of outer light in the same manner as the reference light detector. Thus, the reference points a, b in the present invention can be determined by measuring the principal stress differences and principal stress directions at a large number of points. Further, by determining the reference points a and b, L can be determined.

Now, the present invention will be described in detail with reference to Examples. However, it should be understood that the present invention is by no means restricted to such specific Examples.

A tempering treatment was conducted to a stepped glass sheet as shown in FIGS. 1 and 2. The tempered stepped glass sheet has such a shape slightly curved to have a cylindrical form, and is used as a window glass for a side door of an automobile, the window glass being slidable in a vertical direction or an inclined vertical direction.

A quenching apparatus formed by improving the quenching apparatus disclosed in EP884286A was used. Namely, the nozzles of the quenching apparatus were arranged with a small pitch and the diameter of the openings was made small With the arrangement of the nozzles with a small pitch, a necessary distance for oscillating could be reduced, and a clear difference in quenching performance could be provided around the border between a portion requiring a large quenching performance and a portion requiring a small quenching performance. Further, by reducing the diameter of the openings, the sensitivity of cooling performance to the distance between the glass sheet and the nozzles could be increased whereby a large difference of cooling performance could be provided between a portion having a thinner thickness and a portion having a thicker thickness even though the distance between the glass sheet and the nozzles was small. Thus, a desirable distribution of stress could be obtained.

A glass sheet is cut to have a predetermined shape and its peripheral edge portion is chamfered. In this case, the chamfering treatment is conducted with use of a chamfering wheel for forming a stepped portion so that a predetermined portion of the periphery of glass sheet has a stepped portion. Then, the glass sheet was bent by applying heat, and the bent glass sheet was tempered by using the improved type quenching apparatus. The stepped glass sheet has outer dimensions of 1100×500 mm, a thickness of 6 mm in the central region C, a thickness of 3 mm in the peripheral edge region A and a width of 10 mm in the peripheral edge region A. The averaged surface compressive stress in each region of the tempered stepped glass sheet was measured in accordance with the before-mentioned (A) "measurement of an averaged surface compressive stress". As a result, there were found 1100 kg/cm² in the central region C, 1200 kg/cm² in the peripheral edge region A, and 1300 kg/cm² in the intermediate region B.

On the other hand, on the thus obtained glass sheet, featured points having a larger principal stress difference than any point near and around the featured points were specified in accordance with the before-mentioned (B) "measurement of a principal stress direction and a principal stress difference". There was found that second featured points which were nearest to the first featured points in the intermediate region B and which had a larger principal stress difference than any point near and around the second featured points were in the peripheral edge region A. The distance between the first featured point and the second featured point was 10 mm. As tests for confirming the strength, a hammer test wherein a hammer of 1.5 pounds is dropped to each region from a height of 40 cm and a ball drop test wherein a steel ball of 227 g is dropped for destruction from a height of more than 2 m were conducted. These tests were conducted in reference to tests for window glass for automobiles ruled in JIS-R3212. As a result of the tests, the stepped glass sheet satisfied the standards ruled in JIS-R3212.

In accordance with the stepped glass sheet of the present invention, a large surface compressive stress can be applied to the intermediate region B located between the central region C having a larger thickness and the peripheral edge region A having a smaller thickness whereby a sufficient strength can be maintained as a safety glass for an automobile.

What is claimed is:

1. A stepped glass sheet having a peripheral edge region, a central region, and an intermediate region, wherein said intermediate region is provided between said peripheral edge region and said central region, wherein a stepped portion is formed at a border between said peripheral edge region and said intermediate region, and wherein a thickness of said peripheral edge region is thinner than a thickness of said central region, said stepped glass sheet comprising:

a single, non-laminated glass sheet which is tempered; and an averaged value of surface compressive stresses in said intermediate region is 100–500 kg/cm² larger than an averaged value of surface compressive stresses in said central region.

2. The stepped glass sheet according to claim 1, further comprising first and second borders of said intermediate region, wherein said first border of said intermediate region is located at an intersection of said peripheral edge region and said intermediate region to form a surface of said stepped portion, wherein said second border is located at an intersection of said intermediate region and said central region, and wherein said second border ranges from 5 to 30 mm away from said first border.

3. The stepped glass sheet according to claim 1, wherein each first featured point of said first featured points have a larger principal stress difference than any point near and around said imaginary first featured points, said first featured points being scattered throughout a thickness of said intermediate region, and a distance between each first featured point of said first featured points and a second featured point is 5–15 mm, said second featured point being scattered throughout a thickness of said stepped glass sheet in any one of said peripheral edge, intermediate, and central regions, being nearest to each first featured point of said first featured points, and having a larger principal stress difference than any point near and around said second featured point.

4. The stepped glass sheet according to claim 1, wherein said averaged value of said surface compressive stresses in said central region is 850–1200 kg/cm$^2$.

5. The stepped glass sheet according to claim 1, wherein each first featured point of said first featured points have a larger principal stress difference than any point near and around said imaginary first featured points, said first featured points being scattered throughout a thickness of said intermediate region, and a distance between each first featured point of said first featured points and a second featured point is 5–15 mm, said second featured point being scattered throughout a thickness of said stepped glass sheet in any one of said peripheral edge, intermediate, and central regions, being nearest to each first featured point of said first featured points, and having a larger principal stress difference than any point near and around said second featured point.

6. The stepped glass sheet according to claim 5, wherein said averaged value of said surface compressive stresses in said central region is 850–1200 kg/cm$^2$.

7. The stepped glass sheet according to claim 1, wherein said stepped glass sheet is vertically slidable in a side window for an automobile.

8. The stepped glass sheet according to claim 7, wherein said stepped glass sheet is curved so as to have a convex surface facing outwardly to make up an outer periphery of the automobile.

9. The stepped glass sheet according to claim 8, wherein said stepped portion is formed at a side of said convex surface of said stepped glass sheet in an upper, outer portion thereof, when said glass sheet is oriented as in a typical automobile.

10. The stepped glass sheet according to claim 9, wherein said stepped portion is formed in said upper portion of said stepped glass sheet and both said portions of said stepped glass sheet, in a state that said stepped glass sheet is attached to the automobile.

11. The stepped glass sheet according to claim 1, further comprising first and second borders of said intermediate region, wherein said first border of said intermediate region is located at an intersection of said peripheral edge region and said intermediate region to form a surface of said stepped portion, wherein said second border is located at an intersection of said intermediate region and said central region, and wherein said second border ranges from 5 to 30 mm away from said first border.

12. The stepped glass sheet according to claim 1, wherein each first featured point of said first featured points have a larger principal stress difference than any point near and around said imaginary first featured points, said first featured points being scattered throughout a thickness of said intermediate region, and a distance between each first featured point of said first featured points and a second featured point is 5–15 mm, said second featured point being scattered throughout a thickness of said stepped glass sheet in any one of said peripheral edge, intermediate, and central regions, being nearest to each first featured point of said first featured points, and having a larger principal stress difference than any point near and around said second featured point.

13. The stepped glass sheet according to claim 8, wherein said averaged value of said surface compressive stresses in said central region is 850–1200 kg/cm$^2$.

14. The stepped glass sheet according to claim 9, further comprising first and second borders of said intermediate region, wherein said first border of said intermediate region is located at an intersection of said peripheral edge region and said intermediate region to form a surface of said stepped portion, wherein said second border is located at an intersection of said intermediate region and said central region, and wherein said second border ranges from 5 to 30 mm away from said first border.

15. The stepped glass sheet according to claim 9, wherein each first featured point of said first featured points have a larger principal stress difference than any point near and around said imaginary first featured points, said first featured points being scattered throughout a thickness of said intermediate region, and a distance between each first featured point of said first featured points and a second featured point is 5–15 mm, said second featured point being scattered throughout a thickness of said stepped glass sheet in any one of said peripheral edge, intermediate, and central regions, being nearest to each first featured point of said first featured points, and having a larger principal stress difference than any point near and around said second featured point.

16. The stepped glass sheet according to claim 9, wherein said averaged value of said surface compressive stresses in said central region is 850–1200 kg/cm$^2$.

17. The stepped glass sheet according to claim 10, further comprising first and second borders of said intermediate region, wherein said first border of said intermediate region is located at an intersection of said peripheral edge region and said intermediate region to form a surface of said stepped portion, wherein said second border is located at an intersection of said intermediate region and said central region, and wherein said second border ranges from 5 to 30 mm away from said first border.

18. The stepped glass sheet according to claim 10, wherein each first featured point of said first featured points have a larger principal stress difference than any point near and around said imaginary first featured points, said first featured points being scattered throughout a thickness of said intermediate region, and a distance between each first featured point of said first featured points and a second featured point is 5–15 mm, said second featured point being scattered throughout a thickness of said stepped glass sheet in any one of said peripheral edge, intermediate, and central regions, being nearest to each first featured point of said first featured points, and having a larger principal stress difference than any point near and around said second featured point.

19. The stepped glass sheet according to claim 10, wherein said averaged value of said surface compressive stresses in said central region is 850–1200 kg/cm$^2$.

* * * * *